(12) United States Patent
Lanticq

(10) Patent No.: US 10,274,345 B2
(45) Date of Patent: Apr. 30, 2019

(54) OPTOELECTRONIC DISTRIBUTED MEASURING DEVICE BASED ON BRILLOUIN SCATTERING

(71) Applicant: Febus Optics, Pau (FR)

(72) Inventor: Vincent Lanticq, Pau (FR)

(73) Assignee: Febus Optics, Pau (FR)

( * ) Notice: Subject to any disclaimer, the term of this patent is extended or adjusted under 35 U.S.C. 154(b) by 0 days.

(21) Appl. No.: 15/773,626

(22) PCT Filed: Nov. 4, 2016

(86) PCT No.: PCT/FR2016/052870
§ 371 (c)(1),
(2) Date: May 4, 2018

(87) PCT Pub. No.: WO2017/077257
PCT Pub. Date: May 11, 2017

(65) Prior Publication Data
US 2019/0063963 A1 Feb. 28, 2019

(30) Foreign Application Priority Data

Nov. 6, 2015 (FR) ...................................... 15 60681

(51) Int. Cl.
*G01D 5/353* (2006.01)
*G01B 11/16* (2006.01)
(52) U.S. Cl.
CPC ..... *G01D 5/35364* (2013.01); *G01D 5/35303* (2013.01)
(58) Field of Classification Search
CPC .................. G01D 5/35364; G01D 5/35303
(Continued)

(56) References Cited

U.S. PATENT DOCUMENTS 9,120,286 B2 * 9/2015 Dailey ...................... B32B 7/02
9,244,009 B2 * 1/2016 Handerek ............... E21B 47/06

FOREIGN PATENT DOCUMENTS

JP 2010217029 A 9/2010

OTHER PUBLICATIONS

Daisuke Lida et al. "Cost-effective bandwidth-reduced Brillouin optical time domain reflectrometry using a reference Brillouin scattering beam," Applied Optics, Optical Society of America, Washington, DC., vol. 48, No. 22, Jul. 21, 2009, pp. 4302-4309.
(Continued)

*Primary Examiner* — Seung C Sohn
(74) *Attorney, Agent, or Firm* — Steven M. Shape; Dennemeyer & Associates

(57) ABSTRACT

The invention relates to a method for digitally processing a signal from an optoelectronic distributed measuring device based on Brillouin scattering, said device comprising a continuous light source (1), a coupler (2), an acousto-optic modulator (3), an optical fiber (5) to be tested so that it emits in return a signal by spontaneous Brillouin backscattering at a frequency vF equal to vp–vBz, where vBz is the Brillouin frequency to be measured at every point z of said optical fiber (5), a local oscillator (16) emitting another light signal intended to be mixed with said return signal emitted by Brillouin backscattering by said optical fiber (5) to be tested, a detection module (9) able to detect said Brillouin shift frequency vBz at every point z of said optical fiber and a processing module for linking this Brillouin shift frequency vBz at every point z of said optical fiber to a temperature value and a strain value. According to the invention, the local oscillator (16) comprises a reference optical fiber (18) having a Brillouin frequency identical or close to that of the optical fiber (5) to be tested, said reference optical fiber (18) emitting a signal by spontaneous Brillouin backscattering, in
(Continued)

response to said continuous light signal emitted in said second arm by said light source (1), said Brillouin backscattering signal being emitted at a frequency $v_{OL}=v0-v_{BRef}$, where $v_{BRef}$ is the Brillouin frequency of the reference fiber without strain and at a reference temperature.

11 Claims, 8 Drawing Sheets

(58) Field of Classification Search
USPC .................................................. 250/227.18
See application file for complete search history.

(56) References Cited

OTHER PUBLICATIONS

Yuguo Yao et al. "Reducing Trade-Off Between Spatial Resolution and Frequency Accuracy in BOTDR Using Cohen's Class Signal Processing Method," IEEE Photonics Technology Letters, IEEE Service Center, Piscataway, NJ, vol. 24, No. 15, Jul. 5, 2012, pp. 1337-1339.

Written Opinion of the International Searching Authority in connection with PCT Application No. PCT/FR2016/052870 dated Feb. 2, 2017.

\* cited by examiner

OPTOELECTRONIC DISTRIBUTED MEASURING DEVICE BASED ON BRILLOUIN SCATTERING

CROSS-REFERENCE TO RELATED APPLICATIONS

This is a 35 U.S.C. 371 National Stage Patent Application of International Application No. PCT/FR2016/052870, filed Nov. 4, 2016, which claims priority to French application 1560681, filed Nov. 6, 2015, each of which is hereby incorporated by reference in its entirety.

FIELD OF THE INVENTION

The invention relates to an optoelectronic distributed measuring device based on Brillouin scattering in an optical fiber using a single laser frequency to generate a light pulse. This type of device is also called a distributed optical fiber sensor based on Brillouin backscattering.

Such devices are used for permanently controlling the integrity and safety of systems and structures in civil engineering or the oil industry. They are used in particular for monitoring linear works such as bridges, dams, hydraulic earth dikes or networks for transporting fluids (water, hydrocarbons, gas) in order to control the ground movements (sliding, settling) or the strains of buried or non-buried pipes. An optical fiber is arranged along a work to be monitored and a light signal is injected into said fiber. The light signal backscattered by the optical fiber then allows to deduce the structural state of the work.

PRIOR ART

These optoelectronic distributed measuring devices based on Brillouin scattering are more particularly used for measuring, in real time, the temperature or the strains of large infrastructures in order to monitor their structural health and to ensure their maintenance. They provide, with each measurement, the temperature and strain information at every point of the optical fiber connected to them. The measurements are generally carried out with a range of a few meters to several tens of kilometers and a metric or even centimetric resolution. Thus, for example, a measurement can be carried out every meter on a work with a length of 20 kilometers.

Such devices using the Brillouin backscattering phenomenon are already known and used for temperature and strain measurement applications in civil engineering.

The Brillouin frequency VB linearly depends on the temperature and on the strain in the material. The frequency shift $\Delta_{v_B}$ between the incident wave and the backscattered wave therefore varies with the temperature variations $\Delta T$ and strain variations $\varepsilon$ according to the equation: $\Delta v_B = C_T \Delta T + C_\varepsilon \varepsilon$, where $C_T$ and $C_\varepsilon$ are the temperature and strain sensitivity coefficients specific to the optical fiber used, respectively. At the wavelength $\lambda 0 = 1550$ nm and for a standard fiber as defined by the ITU-G652 standard (such as, for example, Coring®-SMF-28™ fibers), the coefficients are of the order of $C_T \approx 1$ MHz/° C. and $C_\varepsilon \approx 0.05$ MHz/µε.

In order to be able to analyze intensity variations over tens of kilometers with a metric spatial resolution, the measurement systems generally use optical time domain reflectometry OTDR (English acronym for 'Optical Time Domain Reflectometry'). OTDR consists in propagating a light pulse in the optical fiber to be analyzed and measuring the return intensity as a function of time. The time needed for the backscattered light to be detected allows to locate the event to be measured (coordinate of a point z along the optical fiber). The spatial resolution is then a function of the width of the light pulse: a pulse with a width of 10 ns resulting for example in a resolution of about 1 m.

Thanks to the Brillouin backscattering phenomenon combined with the OTDR technique, temperature and strain measurements are carried out all along the fiber, over several tens of kilometers, with a metric or even centimetric resolution.

The measurements along the fiber are performed with a device as shown schematically in FIG. 1. The light from a light source 1, such as a laser, is distributed into two arms. One of the arms, called a 'pump', allows to send the light signal, in a pulsed form, through an acousto-optic modulator 3, in the optical fiber 5 to be tested. A signal is backscattered by the fiber 5, according to the Brillouin phenomenon. According to the Brillouin phenomenon, the spectrum components of light backscattering by the material constituting the optical fiber, in general silica, have a frequency $vB_z$ shifted from that v0 of the incident light wave. The Brillouin frequency shift is generally of the order of 11 GHz for an incident wave of a wavelength $\lambda 0 = 1550$ nm. Such a frequency is very high. In order to be able to perform the processing on the backscattered signal, it is possible to transpose the frequency to a lower frequency in order to reduce the bandwidth of the detector to be used and therefore eliminate a large part of the noise. For this, a heterodyne detection is carried out as described for example in document U.S. Pat. No. 7,283,216. Heterodyne detection consists in recombining the backscattered signal to be analyzed with a wave from the other arm, called a 'local oscillator' 6. This local oscillator 6 may for example be in the form of a Brillouin ring laser. In this case, the continuous light signal with a frequency $v_0$ is directed to a circulator 7 which in turn directs it to a reference fiber. This reference fiber emits by amplified spontaneous scattering a radiation in the opposite direction with a frequency $v_0 - v_{Bref}$ that the circulator sends to a coupler 13. The latter sends a portion of the energy to the output signal, while it redirects the other portion to the reference fiber where the radiation is amplified by a gain factor G by stimulated Brillouin scattering before being redirected to the circulator 7 which sends the amplified radiation back to the coupler 13 and the output. The local oscillator 6 then forms a stimulated Brillouin scattering amplification ring. A photodetector 9 allows to recover the beat of the two signals. The recovered beat is then amplified, and then transmitted to an electric spectrum analyzer 10.

Such an optoelectronic distributed measuring device based on Brillouin scattering in an optical fiber, using a single laser frequency to generate a light pulse, is more particularly described in document U.S. Pat. No. 7,283,216. The device according to this document allows to perform, in real time, simultaneous temperature and stress measurements. A heterodyne detector allows to recover the beat, between the signal from the local oscillator and the signal backscattered by the fiber to be analyzed, which is in a frequency band usable by an analog receiver. The local oscillator used in this document is formed by a Brillouin ring laser and requires the circuit to be coherent, that is to say that the return wave is in phase with the incident wave. The length of the reference fiber and the laser frequency must therefore be controlled and adjusted so that the cavity of the local oscillator provides the right frequency v0 to allow the frequency of the signal backscattered by the fiber to be tested to be transposed at a lower frequency. The device described in this document is therefore complex to implement because it requires preliminary checks so as to avoid creating disturbances on the return signal. In addition, the detection is an analog heterodyne detection, requiring the use of relatively bulky and energy consuming analog electronic components.

Document CA 2,274,505 describes a device and a method for accurately and simultaneously measuring the temperature and stress variations all along an optical fiber, itself arranged along a work, the structure of which is to be monitored. However, the device described is complex to implement. Indeed, analyzing the detected signal is complex because it takes into account not only the Brillouin backscattering phenomenon, but also another Rayleigh backscattering phenomenon. An optical detector comprising a scanning optical filter allows to resolve Rayleigh peaks and Brillouin peaks and to convert the optical signals into electrical signals, which are then processed by an analog processing means. Measuring the temperature and the stress at every point along the fiber comes down to determining the scanning rate of the optical filter, slower than the optical pulse repetition rate, measuring the amplitude and the frequency of the Brillouin lines with respect to the Rayleigh lines as a function of time, and then comparing against a reference fiber. In addition, the device described in this document performs a direct optical detection and not a heterodyne detection. In addition, such a device provides a low frequency resolution induced by the use of a scanning optical filter.

It often happens that civil engineering works, the structure of which is to be analyzed, are isolated from all human activity and therefore from all electrical network. In this case, in order to monitor all or part of the work, an energy autonomous measurement system is necessary. Existing distributed measuring devices based on Brillouin scattering do not allow for an autonomous and low energy consuming operation. They must therefore be placed near technical premises often distant from each other by several hundred kilometers. Since this distance is greater than the maximum range of these devices, part of the civil engineering works cannot be continuously monitored by the existing distributed measuring devices based on Brillouin scattering.

In addition, another disadvantage of the existing systems is the duration of the measurements because this duration is long. Indeed, typically, the measurement duration is greater than 1 minute for a 10 km fiber.

Document JP 2010 217029 A (D1) is considered to be the closest state of the art. However, this document describes a processing method different from the method provided in the present invention. The method provided in the present invention is based on a different principle which allows to optimize the computation time with respect to the best possible spatial resolution.

TECHNICAL PROBLEM

The invention therefore aims to overcome the disadvantages of the prior art. In particular, the object of the invention is to provide a simple and compact optoelectronic distributed measuring device based on Brillouin scattering, the optoelectronic configuration of which allows for a significant reduction in the electrical energy consumed with respect to the existing devices, so that it can be powered with a low voltage, typically 12 or 24 volts, from a battery for example.

The device provided according to the invention comprises fewer elements than the existing systems described above and it is autonomous in energy which allows to have a portable device adapted to interventions by a foot operator or occasional measurements. In addition, the device implements a digital signal processing from the output of the photodetector. The signal processing that follows is carried out digitally at the spectral level and not directly on the signal. Thus, the duration of a measurement is relatively short compared to the measurement duration of the systems of the prior art. Typically, the duration of a measurement is from 1 to a few seconds for a 10 km fiber.

Thus, according to the invention, the digital processing method allows to process the signal from said optoelectronic distributed measuring device based on Brillouin scattering and comprises steps necessary for computing the temperature or strain values in relation to the location along the optical fiber to be tested. This processing is performed from the signal detected by the photodetector of the optoelectronic device and particularly comprises performing a slicing of the digitized signal into a plurality of slices, the width of which is equal to the time width of a half-pulse of the pulsed signal injected into the optical fiber to be tested.

BRIEF DESCRIPTION OF THE INVENTION

The subject matter of the invention is a method for digitally processing a signal from an optoelectronic distributed measuring device based on Brillouin scattering comprising a continuous light source (1) emitting a continuous light signal at a first frequency $v_0$, a coupler (2) able to divide said continuous light signal into two identical signals distributed into two arms, the first arm comprising a device (30) for generating frequency shifted pulses comprising at least one acousto-optic modulator (3) able to transform said continuous signal into a pulsed signal, with a frequency vp, intended to be injected into an optical fiber (5) to be tested so that it emits in return a signal by spontaneous Brillouin backscattering at a frequency vF equal to vp−vBz, where vBz is the Brillouin frequency to be measured at every point z of said optical fiber (5), and the second arm forming a local oscillator (16) emitting another light signal intended to be mixed with said return signal emitted by Brillouin backscattering by said optical fiber (5) to be tested to allow the frequency of said return signal to be lowered, so that a detection module (9) is able to detect said Brillouin shift frequency vBz at every point z of said optical fiber and that a processing module (12) is able to link this Brillouin shift frequency vBz at every point z of said optical fiber to a temperature value and a strain value, wherein the local oscillator (16) comprises a reference optical fiber (18) having a Brillouin frequency identical or close to that of the optical fiber (5) to be tested, said reference optical fiber (18) emitting a signal by spontaneous Brillouin backscattering, in response to said continuous light signal emitted in said second arm by said light source (1), said Brillouin backscattering signal being emitted at a frequency $v_{OL} = v0 - v_{BRef}$, where $v_{BRef}$ is the Brillouin frequency of the reference fiber without strain and at a reference temperature; characterized in that the process comprises the following steps:

a) digitizing a signal corresponding to the beat between a backscattered signal from an optical fiber (5) to be tested and a backscattered signal from a reference optical fiber (18), and detected by a photodetector (9), b) slicing said digitized signal into a plurality of slices (T1 ... Ti ... TN) by applying a sliding time window of the rectangular, or Hamming, or Hann, or Blackman-Harris window type, each slice having a width equal to the time width of a half-pulse of the pulsed signal injected into the optical fiber (5) to be tested, the width of each slice being further centered around a date t corresponding to a point of coordinate z of said optical fiber (5) to be tested, c) computing, by using a fast Fourrier transform FFT algorithm, the frequency spectrum of each slice (T1 . . . Ti . . . TN) of said digitized signal;

d) repeating steps a), b) and c) and averaging the spectra obtained for each point z of said optical fiber to be tested;

e) using the results obtained in the previous step, plotting a graph of the distributed frequency variation measured as a function of the backscattering round-trip time tz, f) applying, on the one hand, a temperature sensitivity coefficient and, on the other hand, a strain sensitivity coefficient, on said measured distributed frequency variation graph obtained, in order to obtain a result in terms of temperature distributed measurement or a result in terms of strain distributed measurement, respectively.

According to other features of the method:

Advantageously, the digital processing is carried out by a graphic processor of the GPU (Graphical Processing Unit) type, because this algorithm is highly parallelizable, namely the same calculation is carried out many times on different signal portions.

the reference optical fiber used has an identical Brillouin frequency or a frequency close to that of the optical fiber to be tested, namely having a frequency deviation of less than 50 MHz, and preferably a deviation of less than 20 MHz.

the bandwidth of the beat is limited to less than 1 GHz, preferably to less than 500 MHz, and preferably in a band centered around 200 MHz, by a photodetector, capable of detecting said beat between the backscattered signal from the optical fiber to be tested and the backscattered signal from the reference optical fiber (18), the digitized signal is the beat signal detected by said photodetector, the digitization being carried out by an analog-to-digital converter the optical intensity noise provided by the Brillouin scattering in the reference fiber is eliminated by a low frequency electric filter arranged between the coupler and the photodetector.

the pulses are shifted in frequency by a frequency shift greater than 100 MHz, and preferably a shift of 200 MHz to 300 MHz carried out by the acousto-optic modulator.

the optoelectronic distributed measuring device based on Brillouin scattering being on board, its power supply is a low-voltage power supply, typically 12 or 24 volts, from a battery.

the device performs a bandpass optical filtering of 10 GHz or less than 10 GHz at the output of the local oscillator, to let only the frequency v0−vBRef pass.

the device allows, at the output of the local oscillator, a polarization scrambling, followed by a variable attenuation for setting the signal level of the local oscillator.

To this end, the optoelectronic distributed measuring device used based on Brillouin scattering comprises a continuous light source emitting a continuous light signal at a first frequency $v_0$, a coupler able to divide said continuous light signal into two identical signals distributed into two arms, the first arm comprising a device for generating frequency shifted pulses comprising at least one acousto-optic modulator able to transform said continuous signal into a pulsed signal, with a frequency vp, intended to be injected into an optical fiber to be tested so that it emits in return a signal by spontaneous Brillouin backscattering at a frequency vF equal to vp−vB$_z$, where vBz is the Brillouin frequency to be measured at every point z of said optical fiber, and the second arm forming a local oscillator emitting another light signal intended to be mixed with said return signal emitted by Brillouin backscattering by said optical fiber to be tested to allow the frequency of said return signal to be lowered, so that a detection module is able to detect said Brillouin shift frequency vB$_z$ at every point z of said optical fiber and that a processing module is able to link this Brillouin shift frequency vBz at every point z of said optical fiber to a temperature value and a strain value. The local oscillator of said device comprises a reference optical fiber having a Brillouin frequency identical or close to that of the optical fiber to be tested, said reference optical fiber emitting a signal by spontaneous Brillouin backscattering, in response to said continuous light signal emitted in said second arm by said light source, said Brillouin backscattering signal being emitted at a frequency $v_{OL}=v_0-v_{BRef}$, where $v_{BRef}$ is the Brillouin frequency of the reference fiber without strain and at a reference temperature.

Thus, the device used allows to eliminate all necessary preliminary checks when using a local oscillator having a Brillouin ring laser configuration. Indeed, in the configuration according to the invention, the return signal emitted by the reference fiber is an amplified spontaneous scattering signal, and not the product of a resonance in a laser type cavity (which would greatly depend on the exact length of the cavity, difficult to control depending on the influence parameters such as the temperature).

According to other optional features of the device:

the reference optical fiber has a Brillouin frequency identical, or a frequency close, to that of the optical fiber to be tested, namely having a frequency deviation of less than 50 MHz, and preferably a deviation of less than 20 MHz.

the device according to the invention further comprises:
a coupler with at least two entries for receiving the backscattered signal at the output of the circulator and the signal from the local oscillator and for mixing them,
a polarization scrambler arranged upstream of the entries of the coupler, the detection module comprising, on the one hand, a photodetector limiting the bandwidth to less than 1 GHz, preferably to less than 500 MHz, and preferably in a band centered around 200 MHz, capable of detecting a beat between the backscattered signal from the optical fiber to be tested and the backscattered signal from the reference optical fiber, and an analog-to-digital converter able to digitize said beat detected by said photodetector.

the device also comprises a low frequency electric filter arranged after the photodetector. This filter allows the low-frequency noise to be reduced and thus the signal-to-noise ratio to be improved, the acousto-optic modulator with a frequency shift greater than 100 MHz, and preferably a shift of 200 MHz to 300 MHz.

the processing module is a digital processing module able to use a fast Fourier transform (FFT) algorithm to calculate the Brillouin frequency at every point z of said optical fiber to be tested, and then to average the spectra obtained in the frequency domain for each point z of said fiber in order to determine the distributed measurement of the frequency variation along said fiber.

Advantageously, the device is on board and powered with a low voltage, typically 12 or 24 volts, from a battery. The device is therefore easily portable and can be used for operations performed by foot operators or occasional measurements.

Other advantages and characteristics of the invention will appear upon reading the following description given by way of illustrative and non-limiting example, with reference to the appended figures which represent:

FIG. 1, already described, a diagram of an optoelectronic distributed measuring device based on Brillouin backscattering according to the prior art, FIG. 2, a diagram of an optoelectronic distributed measuring device based on Brillouin backscattering according to the invention, FIGS. 3A to 3E, time or spectrum traces obtained at each step of the method for digitally processing the digitized signal, obtained after recombination of the signals backscattered by the optical fiber under test and by the reference optical fiber.

Figure 8:
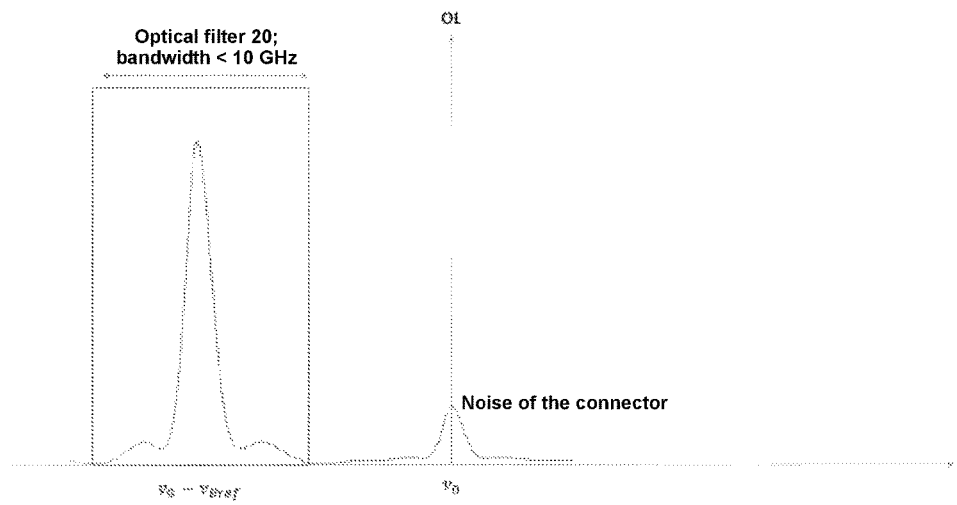
Figure 9:
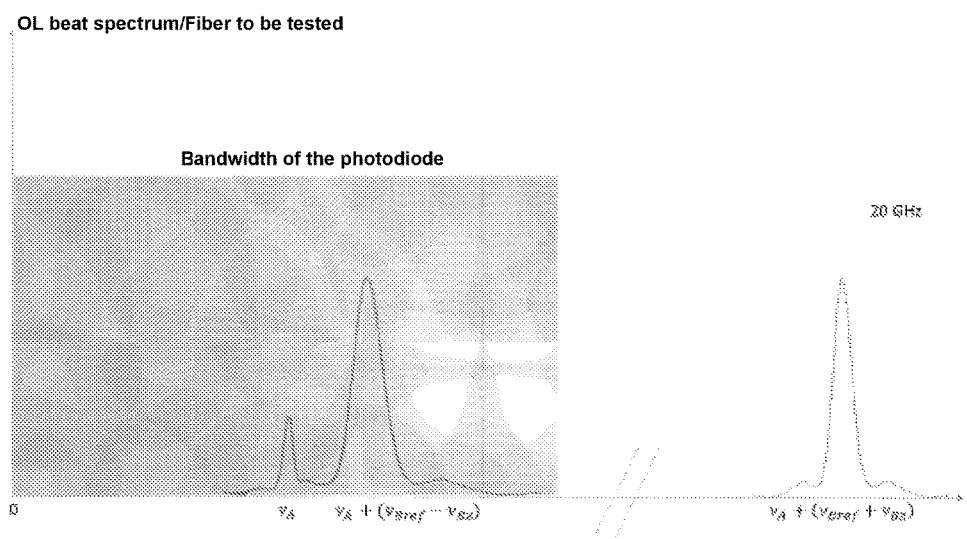

FIG. 8 shows the backscattering spectrum of the local oscillator (OL) 16, with the illustration of a filtering with an optical filter with a band of less than 10 GHz, FIG. 9 shows the beat spectrum between the backscattered signal from the local oscillator 16 and the backscattered signal of the fiber 5 to be tested.

DETAILED DESCRIPTION OF THE INVENTION

Fiber to be tested (or under test) in the following refers to the optical fiber arranged along a work to be monitored and which allows a distributed measurement to be carried out.

By reference fiber is meant a fiber having a Brillouin frequency identical or close to the Brillouin frequency of the test fiber. The term fiber having a close Brillouin frequency refers to a fiber, the Brillouin frequency of which has a frequency deviation with respect to the Brillouin frequency of the test fiber of less than 50 MHz, and preferably a deviation of less than 20 MHz.

By duration of a measurement is meant to the time required for the system to display a measurement at the nominal accuracy (in terms of strain or temperature). This duration includes both:

the acquisition time, the computing time of the system (Fourier transforms, averaging ... )

The present invention relates generally to optoelectronic distributed measuring devices based on Brillouin scattering in an optical fiber. The invention relates more precisely to an optoelectronic configuration of the device allowing its power consumption and its bulk to be reduced.

The use of the measurements returned by this device is devoted to optimizing the maintenance of civil engineering works. The continuity of the measurements along the optical fiber guarantees the detection of an event that would not have been detected by another method using isolated and localized measurements. Early detection of structural disorders in civil engineering works allows for an intervention before further degradation. Conversely, the absence of detection can allow routine maintenance operations to be delayed if they are not necessary. In both cases, such an optoelectronic distributed measuring device based on Brillouin backscattering allows an operator to achieve significant savings on the maintenance of civil engineering works.

Figure 1:
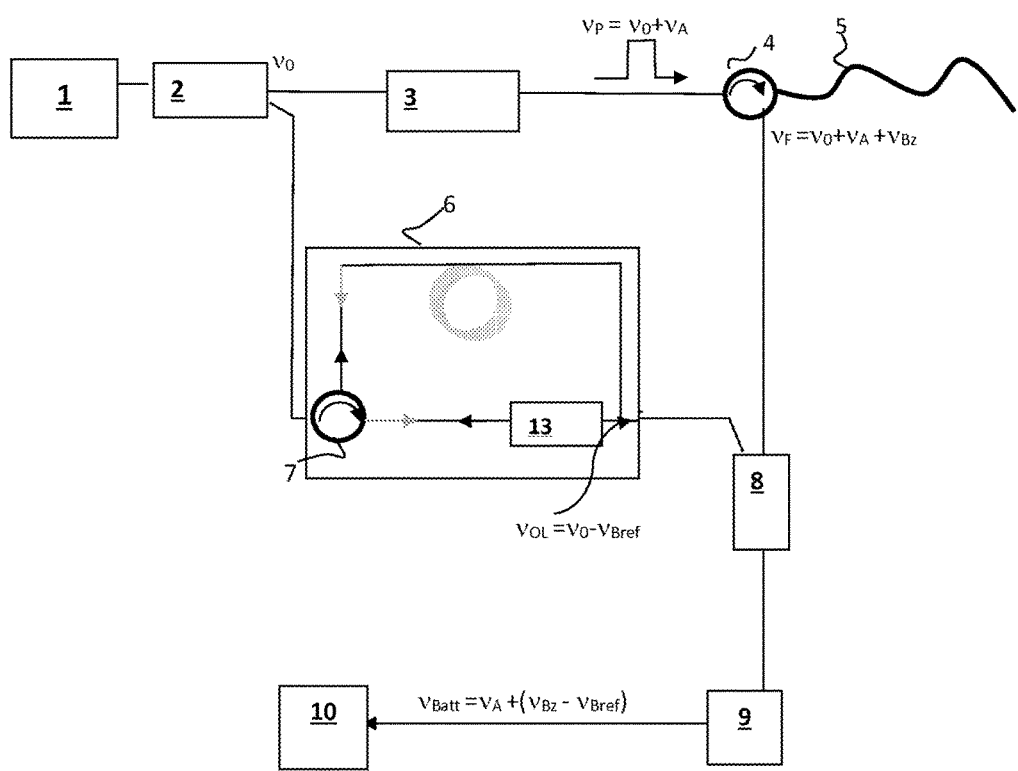
Figure 2:
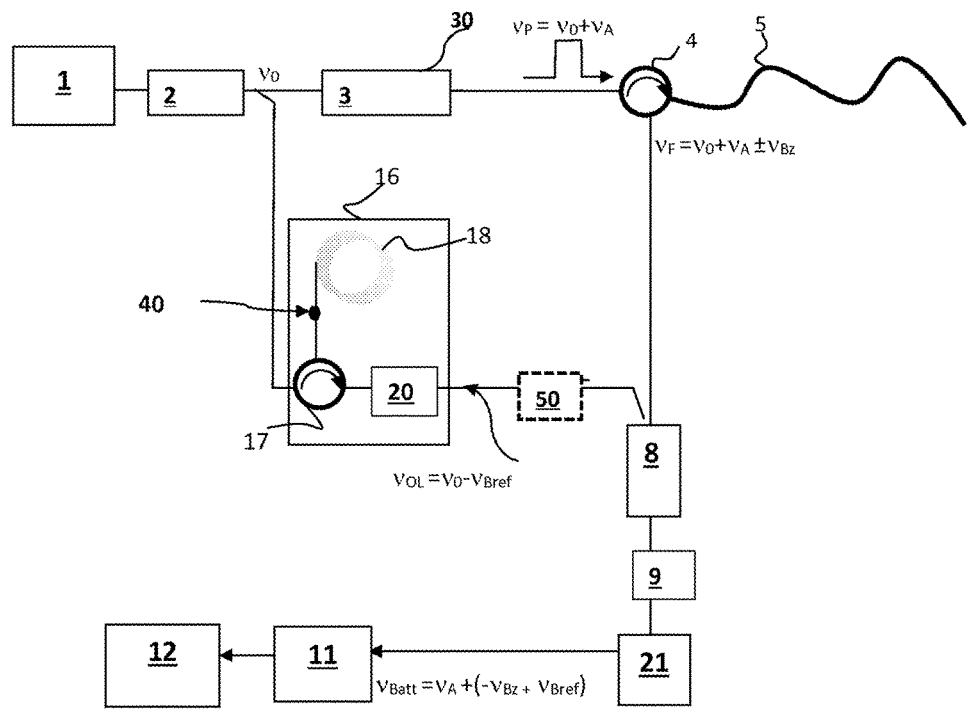

More particularly, FIG. 2 schematically shows the configuration of such an optoelectronic distributed measuring device based on Brillouin backscattering in an optical fiber, according to the invention. The same references as in FIG. 1 are used to designate the same elements. The device according to the invention also comprises a light source 1 emitting a continuous light signal. This light source 1 is advantageously embodied by a laser, preferably a DFB (English acronym for 'Distributed Feedback') laser, using a Bragg grating. The emission wavelength $\lambda_0$ is preferably equal to 1550 nm, at the corresponding frequency $v_0$. The line of the emitted light wave is centered on the emission wavelength $\lambda_0$ and its width is at most 1 MHz. The laser 1 emits a moderately powerful continuous light signal, typically of the order of 20 mW, in an optical fiber connecting it to the coupler 2. The coupler 2 allows to divide the incident light signal emitted by the laser 1 into two identical signals distributed into two arms of the device.

Figure 7:
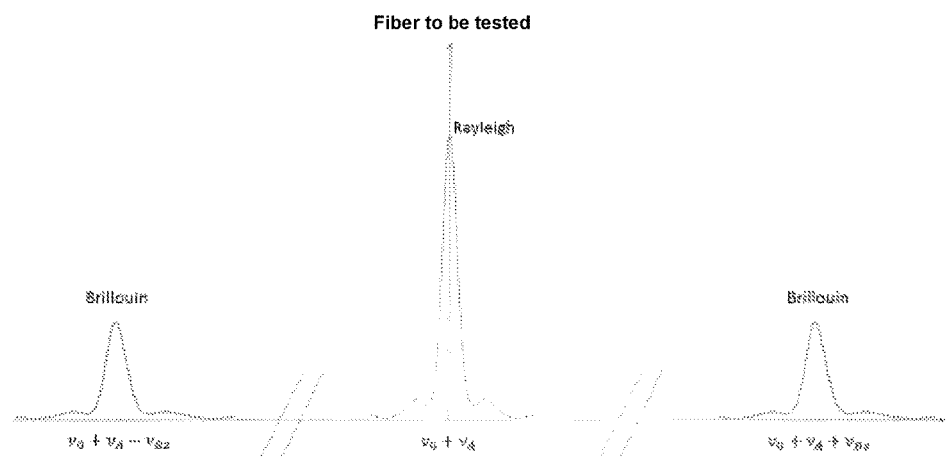
FIG. 7 shows the backscattering spectrum of the fiber 5 to be tested.

The first arm, also called a 'pump', comprises a device 30 for generating frequency shifted pulses. This device 30 comprises at least one acousto-optic modulator 3. It may also comprise one or more amplifiers if necessary to provide gain. The acousto-optic modulator 3 transforms the continuous signal with a frequency $v_0$ into a pulsed signal with a frequency $v_p = v_0 + v_A$, where $v_A$ is the frequency specific to the modulator 3, and is generally greater than or equal to 100 and lower than or equal to 500 MHz, preferably of the order of 200 MHz. The time width of the thus-generated pulse is between 10 ns and 50 ns, preferably it is 20 ns. The pulsed signal is then directed to a circulator 4 which then injects it into the optical fiber 5 to be tested, on which the distributed measurement must be carried out. When the pulsed signal passes, the optical fiber 5 emits in the opposite direction a spontaneous Brillouin backscattering signal at the frequency $v_F = v_0 + v_A + v_{Bz}$, and $v_0 + v_A - v_{Bz}$ in which $v_{Bz}$ is the Brillouin frequency to be measured at every coordinate point z along the optical fiber 5. The diagram of FIG. 7 illustrates the backscattering spectrum of the fiber 5 to be tested. This backscattered signal is directed by the circulator 4 towards the coupler 8 where it is recombined with a signal from the local oscillator forming the second arm of the device.

The local oscillator 16 advantageously comprises a circulator 17 which directs the incident continuous light signal, at the frequency $v_0$, from the laser 1, into a reference optical fiber 18. This reference optical fiber 18 is advantageously identical to the optical fiber 5 under test. The reference fiber 18 is not subject to any strain. It is placed at a reference temperature, generally between 18 and 25° C., preferably at a temperature of the order of 20° C. This reference fiber 18 also allows to emit a Brillouin backscattering signal in response to the continuous signal emanating from the light source 1, so that the local oscillator 16 allows to transform the incident frequency $v_0$ into a frequency $v_{OL} = v_0 - v_{Bref}$, where $v_{Bref}$ represents the Brillouin frequency of the reference optical fiber 18, and which is in the same frequency range as the frequency $v_{Bz}$ from the signal backscattered by the optical fiber 5 under test. The backscattering spectrum of the local oscillator (OL) 16, with the illustration of a filtering with an optical filter of a band of less than 10 GHz, is illustrated in the diagram in FIG. 8. The noise spectrum at $v0$ of the connector 40 schematically shown in FIG. 2 can also be seen in this FIG. 8. The Brillouin frequency of the reference optical fiber 18 is therefore in a frequency range around 11 GHz, generally between 10.5 and 11.5 GHz. The circulator 17 of the local oscillator 16 then sends the backscattered signal to the coupler 8 to mix it with the backscattered signal from the optical fiber 5 under test. Advantageously, there is further provided, at the output of the circulator, a pass band optical filter 20, of 10 GHz or less than 10 GHz, allowing only the frequency $v_0-v_{Bref}$ to pass and cutting the frequency $v_0$ in order to avoid the beat between the Rayleigh scattering in the fiber under test at $v_0+v_A$ and the low reflection of the frequency $v_0$ on the connection symbolized by reference 40 in FIG. 2, between the reference fiber 18 and the device. This therefore allows to eliminate a source of noise. This optical filter 20 is optional. Indeed, an optical splice to make the connection 40 can also reduce this noise, but in fact eliminates the possibility of changing the reference fiber and therefore of varying the frequency $v_{Bref}$.

The signals from the optical fiber 5 under test and from the reference optical fiber 18 are thus recombined in the coupler 8. At the output of the coupler 8, a signal is obtained, which contains a beat between the signal from the optical fiber 5 under test and from the reference optical fiber 18 of the local oscillator 16. FIG. 9 shows the beat spectrum between the backscattered signal from the local oscillator 16 and the backscattered signal from the fiber 5 to be tested. This beat, of a lower frequency, is detectable electronically thanks to the use of a photodetector 9, with a bandwidth of less than 1 GHz, preferably of 500 MHz. At the output of the photodetector 9, an electrical signal corresponding to the beat detected at the frequency $v_{Batt}=v_A+(\pm v_{Bz}+v_{Bref})$ is thus obtained. The beat has a frequency lower than the incident signals because the frequency $v_0$ from the light source 1 is eliminated. Typically, the beat has a frequency lower than 500 MHz, and preferably around 200 MHz, corresponding to the order of magnitude of the frequency specific to the acousto-optical modulator 3. Thus, $v_A+(+v_{Bz}+v_{Bref})$ is around 20 GHz and therefore out of band, the beat of lower frequency $v_A+(v_{Bref}-v_{Bz})$ is in the 200 MHz band and is used in further processing.

Advantageously,—the device also comprises a low frequency electric filter 21 arranged after the photodetector (photodiode). This filter allows for the low-frequency noise to be reduced and thus the signal-to-noise ratio to be improved.

The beat signal obtained is then digitized, by means of an analog-to-digital converter module 11. It is then processed by a digital processing module 12.

The advantageous configuration of the local oscillator 16 according to the invention allows to eliminate all the necessary preliminary checks when using a Brillouin ring laser in order to avoid disturbances on the signal (by laser cavity instability). It also allows to reduce the frequency to be detected by the photodetector to less than 500 MHz, and more particularly in a frequency band centered around 200 MHz. The optical configuration therefore allows to increase the efficiency of the photodetector 9 by limiting the bandwidth to less than 1 GHz instead of 11 GHz, preferably to 500 MHz.

As for the digital processing module 12, it advantageously uses a fast Fourier transform FFT algorithm, for example by means of a logic integrated circuit known by the English acronym FPGA (for 'Field-Programmable Gate Array'). It thus allows to directly calculate the Brillouin frequency at every point of coordinate z of the optical fiber 5 under test. The digital processing module 12 further allows to average the spectra obtained in the frequency domain, for each point z of said fiber, upon completion of the application of the fast Fourier transform FFT algorithm, in order to determine the distributed measurement of the frequency variation along said optical fiber 5 under test.

In an alternative embodiment, a polarization scrambler can be provided at the output of the local oscillator 16, followed by a variable attenuator for eliminating the sensitivity of the device to polarization and setting the signal level of the local oscillator in order to better adapt to the sensitivity of the photodiode. The polarization scrambler and the attenuator are symbolized by the block 50 shown by the dotted line.

The various steps of the digital processing performed on the digitized signal are more particularly illustrated by experimental and explanatory FIGS. 3A to 3E which represent time or spectrum traces obtained at each step of the method for digitally processing the digitized signal, obtained after recombination of the signals backscattered by the optical fiber under test and by the reference optical fiber.

Figure 3A:
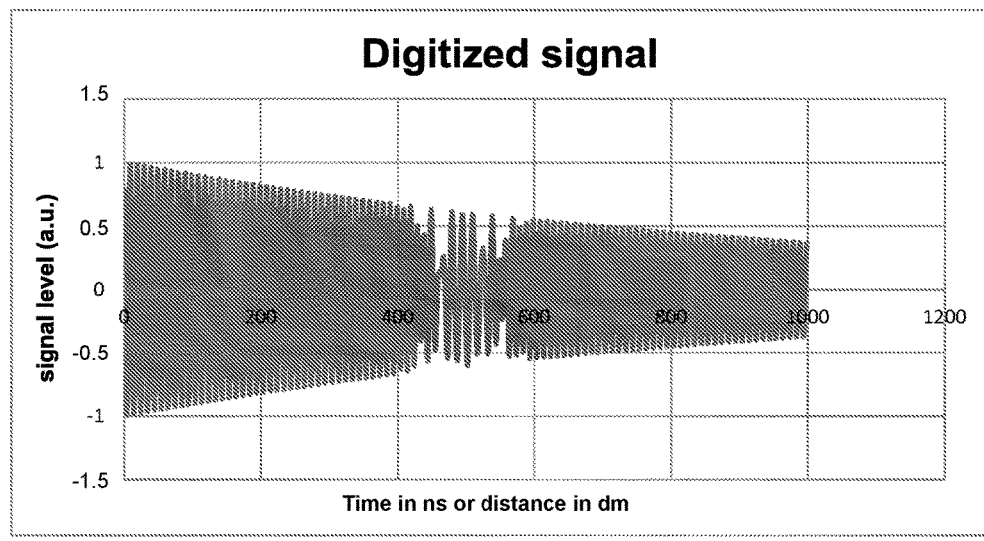

FIG. 3A shows the digitized signal at the output of the analog-to-digital converter 11.

Figure 3B:
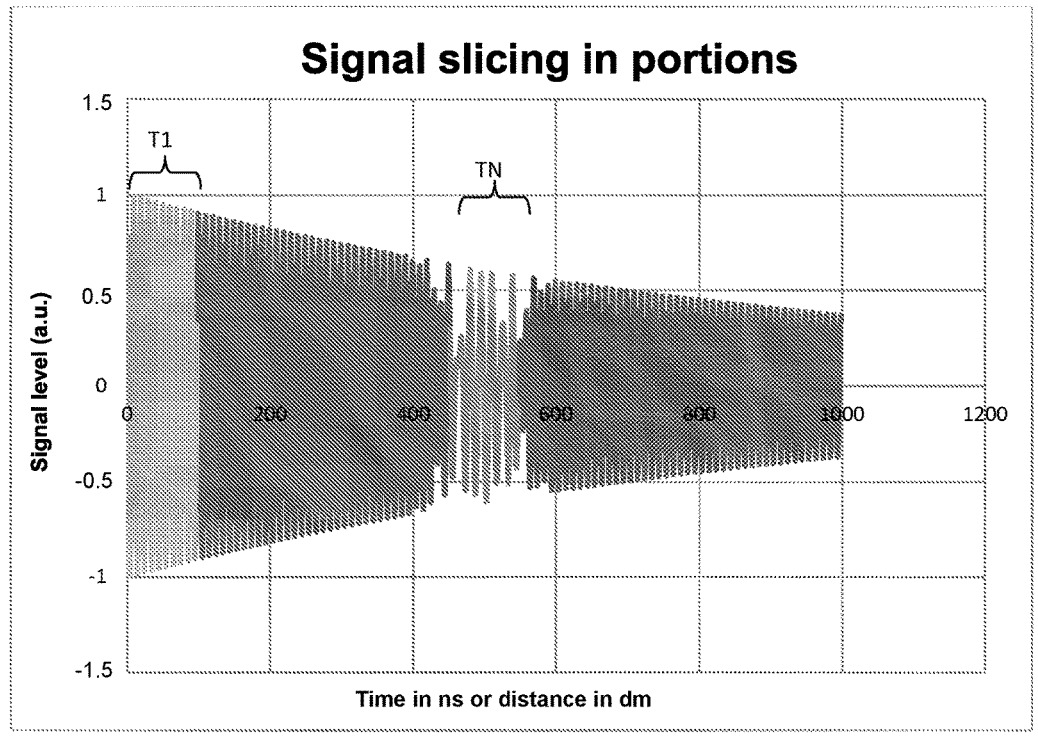

A first step of the digital processing performed by the digital processing module 12 consists in slicing the digitized signal into slices. Slicing into slices is carried out by applying a sliding time window on the signal. Preferably, the windowing is performed by a rectangular, or Hamming, or Hann, or Blackman-Harris window. Slicing of the digitized signal is shown in FIG. 3B, a first slice to be processed being identified by the reference T1, and the slice N, in which the area of the event to be measured is located, being identified by the reference TN. Each slice has a width equal to the time width of a half-pulse of the pulsed signal injected into the optical fiber 5 to be tested. Each slice T1 ... Ti ... TN is further centered around a date corresponding to a coordinate point z of said optical fiber to be tested. Thus, for a coordinate position z on the optical fiber 5, $z=v \cdot tz$, where $v=c/(2 \cdot n)$, where n is the refractive index of the optical fiber, c is the speed of light, v is the frequency of the optical wave, and the time $t_z$ then corresponds to the round-trip time (z) of a pulse, counted from the start point of the pulse to the measurement point z.

The deviation between two measurement points can be as small as 1 sampling unit (sliding of an interval). However, the deviation between 2 independent measurements (spatial resolution) is considered to be equal to the half-width of the pulse. Thus, the deviation between 2 independent measurement points $z(t1)$, $z(t2)$ is equal to the width of a half-pulse.

Figure 3C:
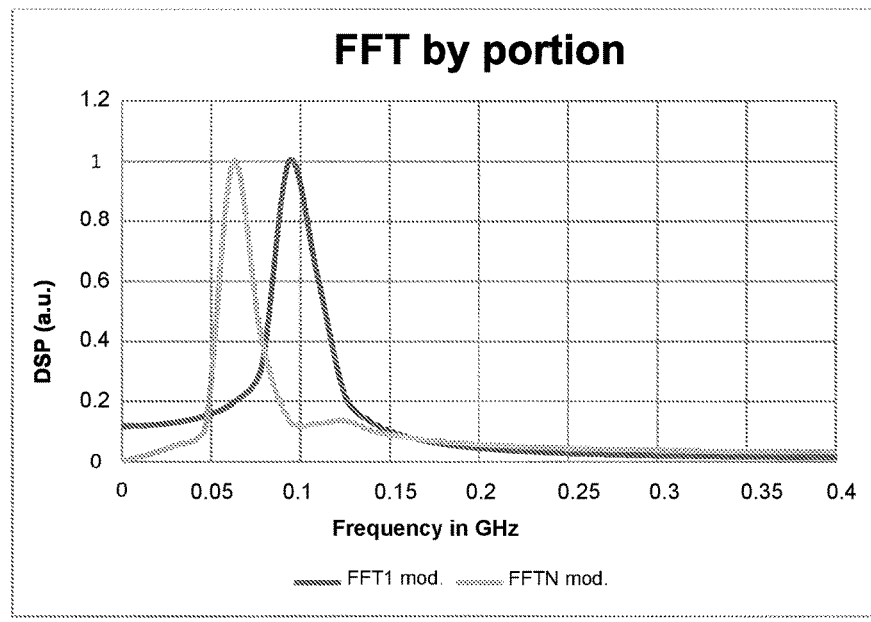

A second step of the digital processing then consists in computing, by using a fast Fourier transform FFT algorithm, the spectrum of each slice T1 ... Ti ... TN of said digitized signal. Thus, a frequency spectrum is obtained for each slice T1 ... Ti ... TN of the digitized signal. Such frequency spectra are illustrated in FIG. 3C for the slices T1 and TN of the sliced signal in FIG. 3B. These frequency spectra allow to obtain the frequency of the beat $v_{Batt}=v_A+(v_{Bref}-v_{Bz})$ and to determine the maximum frequency of the beat corresponding to each slice T1 ... Ti ... TN. A third step consists in repeating the first two slicing steps and using the fast Fourier transform algorithm, and averaging the results in order to obtain an interpretable spectrum, that is to say the maximum of which can be determined. It is about averaging the FFT curves to determine the maximum as accurately as possible. For example, a Gaussian or Lorentz adjustment algorithm is used. This step can be seen as optional, but since the processed signals are noisy, it is necessary in practice.

Figure 3D:
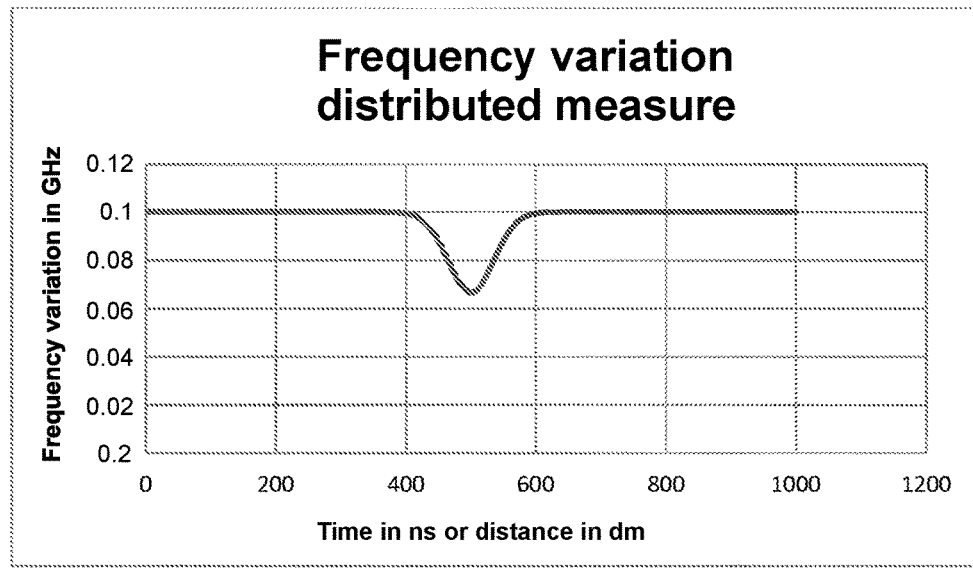

The fourth step of the digital processing then consists in determining the frequency positions of the maxima corresponding to the results of the adjustment algorithms, as a function of the z coordinates of the different points of the optical fiber 5, and plotting a graph of the frequency variation distributed measurement all along the optical fiber 5. Such a graph is shown in FIG. 3D, in which is shown a frequency variation at the duration t=500 ns, corresponding to the event area of the slice TN of FIG. 3B.

Figure 3E:
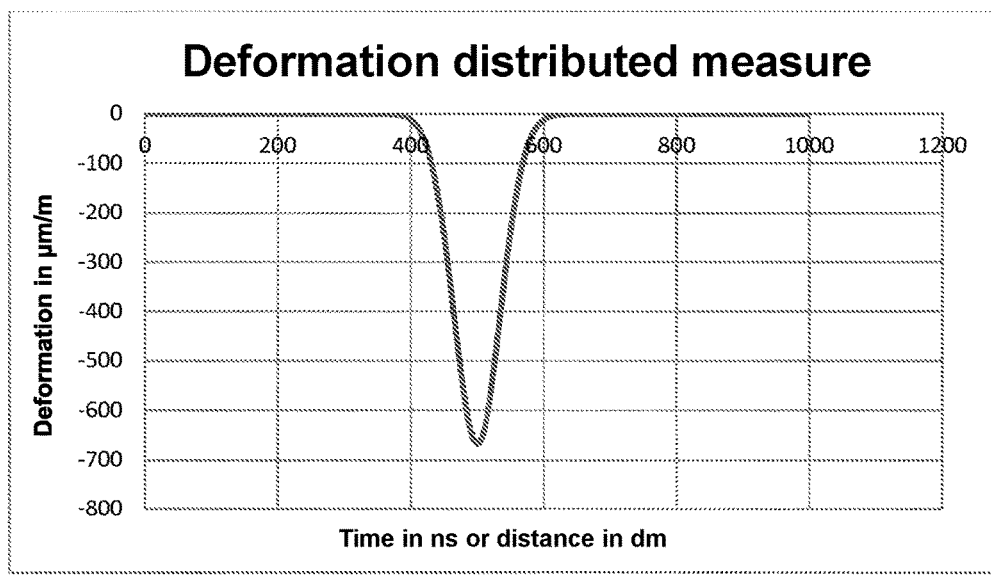

Finally, a last step of the digital processing consists in applying the sensitivity coefficients, of temperature $C_T$ and stress $C_\epsilon$, respectively, specific to the optical fiber 5, to obtain a result in terms of temperature and strain distributed measurement, respectively. FIG. 3E shows a graph obtained after applying the strain sensitivity coefficient $C_\epsilon$, for obtaining the strain c distributed measurement all along the optical fiber. Thus, in this graph, it can be seen that the analyzed optical fiber is deformed by 680 μm/m at the point z corresponding to the duration t of 500 ns. The strain sensitivity coefficient $C_\epsilon$ is typically 0.05 MHz/(μm/m)) and the temperature sensitivity coefficient $C_T$ is typically 1 MHz/° C.

Figure 4A:
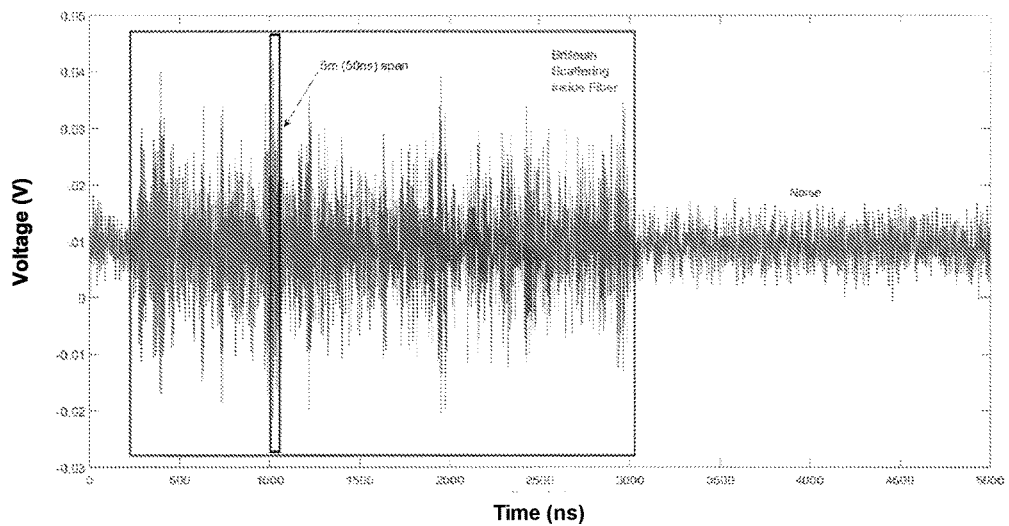
FIGS. 4A to 4C show actual measurements carried out from the device of the invention.
Figure 4B:
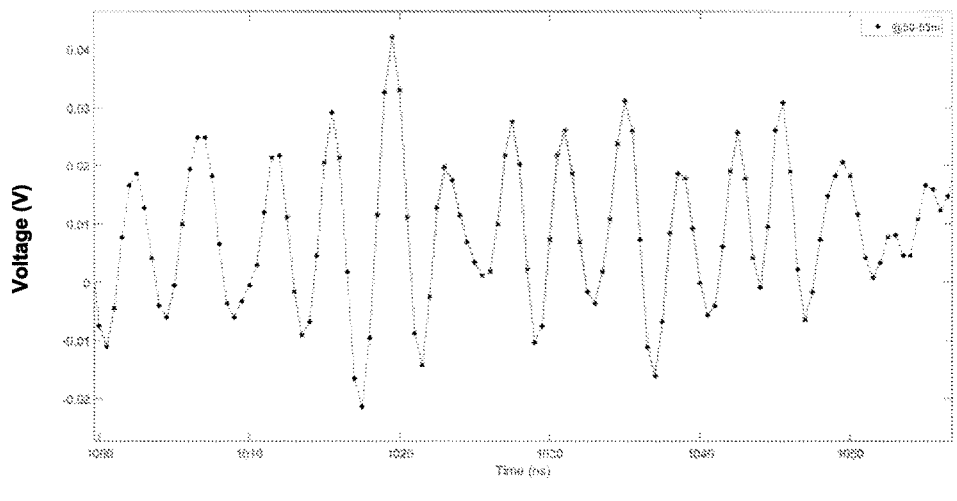
Figure 4C:
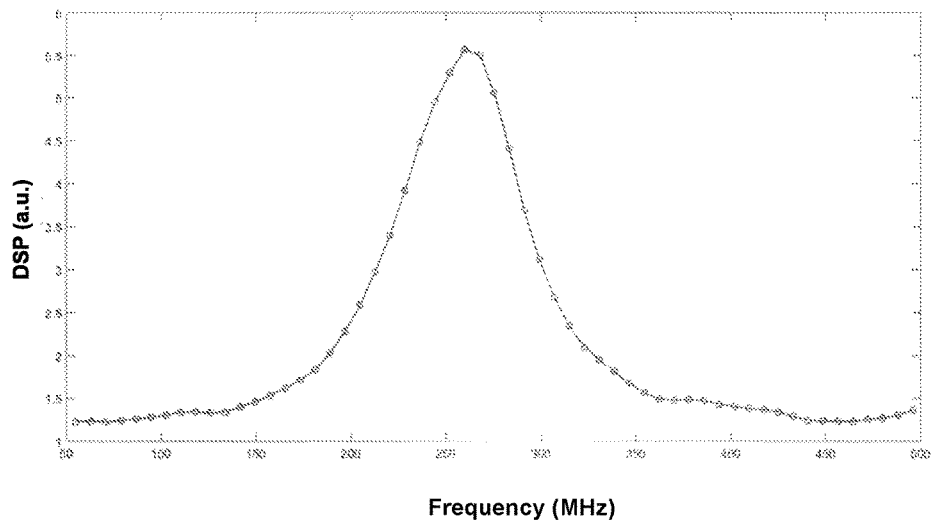

FIGS. 4A to 4C show actual measurements carried out using the invention.

Figure 5:
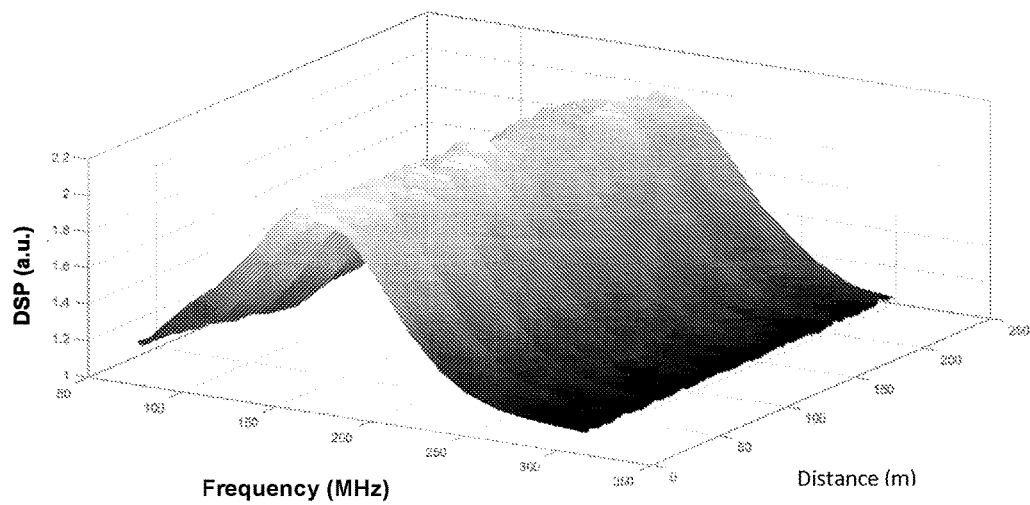
FIG. 5 shows the set of Brillouin scattering spectra on a fiber with a length of about 250 m.
Figure 6:
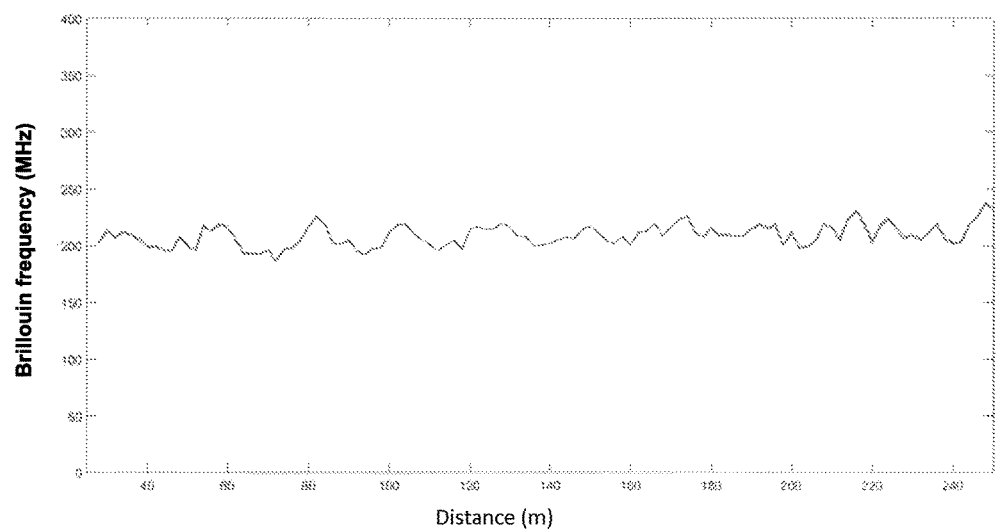
FIG. 6 shows the distributed measurement result, namely the set of maxima of the spectra of FIG. 5.

FIG. 4A shows a time trace acquired directly at the output of the photodetector. It has a random modulation (contrary to explanatory FIG. 3A), but contains, as shown in FIG. 4B, a quasi-sinusoidal component corresponding to the Brillouin scattering. FIG. 4C shows that the averaged spectrum of the time portion, shown in 4B, is as described in explanatory FIG. 2C. FIG. 5 shows the set of Brillouin scattering spectra on a fiber with a length of about 250 m. FIG. 6 shows the distributed measurement result, namely the set of maxima of the spectra of FIG. 5.

The fibers used are monomode fibers, typically G652 Coring®-SMF-28™ type fibers, with an index of typically 1.45, a core diameter of 9 μm, an optical sheath of 125 μm, a mechanical sheath of 250 μm. The length can be from less than 1 km, up to more than 50 km.

The invention allows for all the analog electronic components to be deleted, except for the photodetector 9, and allows them to be replaced by a digitizer 11 and a digital processing module 12. Thus, the noise levels provided by the active analog components, such as amplifiers or oscillators for example, are eliminated. In addition, since the signal processing is entirely digital, processing is less energy consuming and the device is less bulky, so that it can be on board. It can therefore advantageously be powered with a low voltage, typically 12 or 24 volts, from a battery. This battery can also be rechargeable, for example by an insulated solar panel, the power requirement of which is of the order of 100 Watt continuous.

In addition, the device allows to use a digital computing module 12 for performing parallel processing for each slice, which reduces the measurement-to-acquisition duration time, for example for a 10 km fiber, it will be possible to have 10,000 acquisitions per second with a processor clock frequency of 10 KHz, and therefore obtain 10,000 averages. The digital computing module advantageously comprises a graphic processor of the GPU (Graphical Processing Unit) type so as to defer the highly parallelizable computing thereon. Thus, computing is performed in parallel with the acquisition and the duration of a measurement corresponds to the acquisition time. This acquisition time is low compared to the acquisition time of the devices of the prior art.

For an exemplary fiber of 10 km, with a processor clock frequency of 10 KHz, 10,000 acquisitions are performed in one second which allows to have 10,000 averages, whereas in the state of the art the duration of a measurement is greater than one minute for 10 km.

The invention claimed is:

1. A method for digitally processing a signal from an optoelectronic distributed measuring device based on Brillouin scattering comprising a continuous light source (1) emitting a continuous light signal at a first frequency $v_0$, a coupler (2) able to divide said continuous light signal into two identical signals distributed into two arms, the first arm comprising a device (30) for generating frequency shifted pulses comprising at least one acousto-optic modulator (3) able to transform said continuous signal into a pulsed signal, with a frequency vp, intended to be injected into an optical fiber (5) to be tested so that it emits in return a signal by spontaneous Brillouin backscattering at a frequency vF equal to vp−vBz, where vBz is the Brillouin frequency to be measured at every point z of said optical fiber (5), and the second arm forming a local oscillator (16) emitting another light signal intended to be mixed with said return signal emitted by Brillouin backscattering by said optical fiber (5) to be tested to allow the frequency of said return signal to be lowered, so that a detection module (9) is able to detect said Brillouin shift frequency vBz at every point z of said optical fiber and that a processing module (12) is able to link this Brillouin shift frequency vBz at every point z of said optical fiber to a temperature value and a strain value, wherein the local oscillator (16) comprises a reference optical fiber (18) having a Brillouin frequency identical or close to that of the optical fiber (5) to be tested, said reference optical fiber (18) emitting a signal by spontaneous Brillouin backscattering, in response to said continuous light signal emitted in said second arm by said light source (1), said Brillouin backscattering signal being emitted at a frequency $v_{OL}=v0-v_{BRef}$, where $v_{BRef}$ is the Brillouin frequency of the reference fiber without strain and at a reference temperature; characterized in that the process comprises the following steps:

a) digitizing a signal corresponding to the beat between a backscattered signal from an optical fiber (5) to be tested and a backscattered signal from a reference optical fiber (18), and detected by a photodetector (9), b) slicing said digitized signal into a plurality of slices (T1 . . . Ti . . . TN) by applying a sliding time window of the rectangular, or Hamming, or Hann, or Blackman-Harris window type, each slice having a width equal to the time width of a half-pulse of the pulsed signal injected into the optical fiber (5) to be tested, the width of each slice further being centered around a date t corresponding to a point of coordinate z of said optical fiber (5) to be tested, c) computing, by using a fast Fourrier transform FFT algorithm, the frequency spectrum of each slice (T1 . . . Ti . . . TN) of said digitized signal;

d) repeating steps a), b) and c) and averaging the spectra obtained for each point z of said optical fiber to be tested;

e) using the results obtained in the previous step, plotting a graph of the distributed frequency variation measured as a function of the backscattering round-trip time tz, f) applying, on the one hand, a temperature sensitivity coefficient and, on the other hand, a strain sensitivity coefficient, on said measured distributed frequency variation graph obtained, in order to obtain a result in terms of temperature distributed measurement or a result in terms of strain distributed measurement, respectively.

2. The digital processing method according to claim 1 wherein said digital processing is carried out by a graphic processor of the GPU (Graphical Processing Unit) type in parallel with the acquisition.

3. The digital processing method according to claim 1 wherein the reference optical fiber (18) has a Brillouin frequency identical or close to that of the optical fiber (5) to be tested, namely having a frequency deviation of less than 50 MHz, and preferably a deviation of less than 20 MHz.

4. The digital processing method according to claim 1 wherein:
The bandwidth of the beat is limited to less than 1 GHz, preferably to less than 500 MHz, and preferably in a band centered around 200 MHz, by a photodetector (9), capable of detecting said beat between the backscattered signal from the optical fiber (5) to be tested and the backscattered signal from the reference optical fiber (18),
The digitized signal is the beat signal detected by said photo detector (9), the digitization being performed by an analog-to-digital converter (11).

5. The digital processing method according to claim 1 wherein:
The optical intensity noise provided by Brillouin scattering in the reference fiber is eliminated by a low frequency electric filter arranged between the coupler (8) and the photodetector (9).

6. The digital processing method according to claim 1 wherein:
the pulses are shifted in frequency by a frequency shift greater than 100 MHz, and preferably a shift of 200 MHz to 300 MHz carried out by the acousto-optic modulator (3).

7. The digital processing method according to claim 1 wherein:
the optoelectronic distributed measuring device based on Brillouin scattering being on board, its power supply is a low-voltage power supply, typically 12 or 24 volts, from a battery.

8. The digital processing method according to claim 1 wherein:
The device performs a bandpass optical filtering of 10 GHz or less than 10 GHz at the output of the local oscillator (16) to let only the frequency $v_0-v_{BRef}$ pass.

9. The digital processing method according to claim 1 wherein:
The device allows, at the output of the local oscillator (16), a polarization scrambling, followed by a variable attenuation for setting the signal level of the local oscillator (50).

10. The digital processing method according to claim 1 wherein the continuous light source (1) is embodied by a laser using a Bragg grating.

11. The digital processing method according to claim 1 wherein the continuous light source (1) is emitting a light wave which is centered on the emission wavelength $\lambda_0$ and its width is at most 1 MHz.

* * * * *